United States Patent [19]
Bourlion et al.

[11] Patent Number: 5,246,595
[45] Date of Patent: Sep. 21, 1993

[54] PROCESS FOR DEGASSING A COUPLING LIQUID OF A PRESSURE WAVE GENERATOR APPARATUS EMPLOYING COUPLING LIQUID BY CHEMICAL ROUTE, COUPLING LIQUID THUS TREATED AND SHOCK WAVE GENERATOR USING SUCH A COUPLING LIQUID

[75] Inventors: Maurice Bourlion, St Chamond; Paul Dancer, St Etienne, both of France

[73] Assignee: TechnomedInternational, Paris, France

[21] Appl. No.: 717,083

[22] Filed: Jun. 18, 1991

[30] Foreign Application Priority Data

Jun. 19, 1990 [FR] France ............................ 90 07676

[51] Int. Cl.$^5$ .............................................. B01D 19/00
[52] U.S. Cl. ................................ 210/750; 128/660.03; 606/128; 181/115; 181/142
[58] Field of Search ................... 210/748, 750, 243; 422/186.21; 128/24 EL, 660.03; 606/128; 181/142, 115

[56] References Cited

U.S. PATENT DOCUMENTS 2,559,227  7/1951  Rieber .............................. 128/24
4,348,289 12/1980  Snavely, Jr. et al. ............. 210/749
4,530,358  3/1983  Forsmann et al. ............... 128/328

FOREIGN PATENT DOCUMENTS 2223960  4/1990  United Kingdom.

OTHER PUBLICATIONS

Patent Abstracts of Japan vol. 7, No. 83 (C-160), Apr. 6, 1983; JP-A-56 108966, Jan. 21, 1983.
A copy of the French Search Report.

*Primary Examiner*—Stanley S. Silverman
*Assistant Examiner*—Neil M. McCarthy
*Attorney, Agent, or Firm*—Cohen, Pontani, Lieberman, Pavane

[57] ABSTRACT

A process for degassing a coupling liquid is disclosed, comprising adding to said coupling liquid at least one chemical substance readily taking up gas in a sufficient quantity to absorb said gas substantially completely. This chemical substance is preferably a sulfite of alkaline- or alkaline-earth metal. The invention makes it possible to obtain pressure values of the pressure waves greater than those obtained by conventional physical degassing.

21 Claims, 1 Drawing Sheet

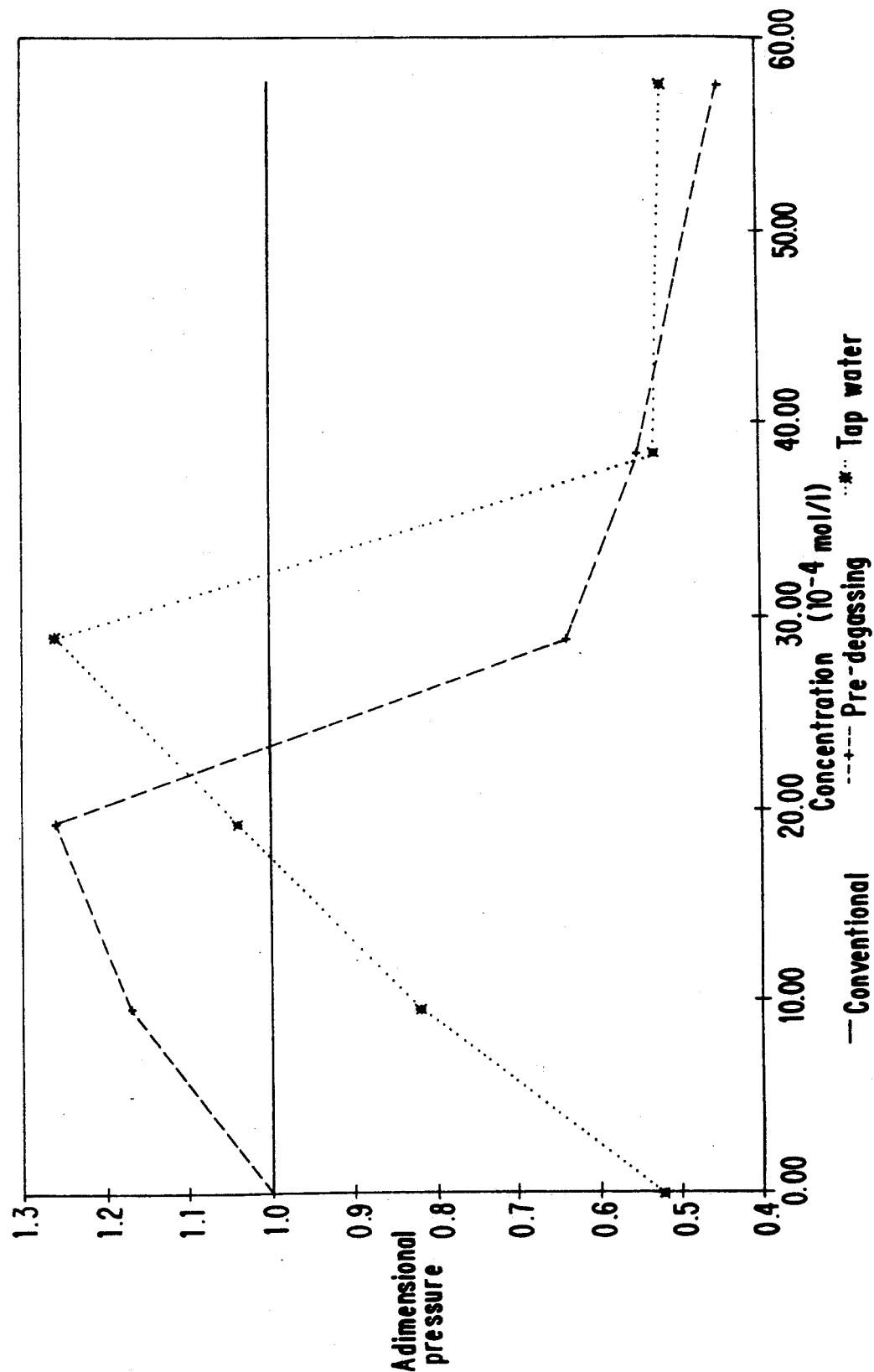

PROCESS FOR DEGASSING A COUPLING LIQUID OF A PRESSURE WAVE GENERATOR APPARATUS EMPLOYING COUPLING LIQUID BY CHEMICAL ROUTE, COUPLING LIQUID THUS TREATED AND SHOCK WAVE GENERATOR USING SUCH A COUPLING LIQUID

FIELD OF THE INVENTION

The present invention essentially relates to a process for degassing a coupling liquid of a pressure wave generating apparatus employing coupling liquid by the chemical route, to a coupling liquid thus treated and to a shock wave generator employing such a coupling liquid.

BACKGROUND OF THE INVENTION

U.S Pat. No. 2,559,227 to RIEBER discloses pressure wave generation by electric discharge between two electrodes disposed at the first focus of a truncated ellipsoid so as to destroy a target disposed at the second focus of the ellipsoid. The pressure wave is created by the electric arc generated between the electrodes which suddenly vaporizes part of the liquid, causing formation of bubbles in the coupling liquid in which the electrodes are immersed. This liquid is constituted in particular by water. In addition, the gases which are dissolved in the liquid are for example nitrogen, oxygen, carbon dioxide gas, in particular when it is question of water. Likewise, a small part of water is also dissociated electrolytically.

Now, for optimum transmission of the pressure waves, it is necessary that the coupling liquid transmitting the pressure waves be bereft of bubbles of gas.

U.S. Pat. No. 4,530,358 proposes to circulate the coupling liquid between the pressure wave generation chamber and a recycling circuit in which at least one gas bubble eliminating device is provided. One of these means consists in particular in a vacuum degassing means (col. 2, lines 43-45). It is also provided to tilt the pressure wave generating and focussing chamber (col. 2, lines 46-53). In an embodiment forming the subject matter of FIG. 2 of U.S. Pat. No. 4,530,458, the liquid communicates freely with the atmosphere and, in that case, a deflecting means is provided, deviating the gas bubbles from the zone of the body of a patient having to receive the pressure waves.

It will be readily appreciated that these means are complicated and expensive, whilst the use of a deflecting device interposed in the path of the pressure waves is not practicable, as this deflecting element constitutes a physical obstacle interrupting the passage of the pressure waves.

It is therefore an object of the present invention to solve the novel technical problem of providing a solution for effecting simple and efficient degassing of a coupling liquid of a pressure wave generating apparatus, ensuring virtually perfect safety and reproducibility.

This novel technical problem is solved for the first time by the present invention in simple, reliable, inexpensive manner, usable on an industrial scale.

SUMMARY OF THE INVENTION

According to a first aspect, the present invention provides a process for degassing a coupling liquid of a pressure wave apparatus employing coupling liquid, characterized in that it comprises the addition to said coupling liquid of at least one chemical substance which readily takes up gas in a sufficient quantity to absorb or eliminate said gas substantially completely.

According to an advantageous embodiment of the process according to the invention, deoxygenation of the coupling liquid is effected by the use of a chemical substance which readily takes up oxygen, in a sufficient quantity to eliminate the oxygen from said coupling liquid substantially completely.

According to a preferred embodiment of the process of the invention, said chemical substance comprises a sulfite, particularly a sulfite of alkaline- or alkaline-earth metal.

According to another preferred embodiment, a sodium or potassium bisulfite is used as said chemical substance.

According to yet another preferred embodiment of the invention, the coupling liquid is constituted by an aqueous solution, for example water.

According to yet another advantageous embodiment, the concentration of said gas-absorbing chemical substance is included between $5.10^{-4}$ and $100.10^{-4}$ mol/l.

According to a second aspect, the present invention also provides a coupling liquid allowing the efficient transmission of pressure waves, characterized in that it comprises at least one chemical substance which readily takes up gas in an efficient quantity to absorb a gas present or generated in said liquid, substantially completely.

According to an advantageous embodiment, this gas-absorbing chemical substance is such as defined hereinabove for the process.

According to a third aspect, the present invention also provides a pressure wave generator employing coupling liquid, characterized in that said coupling liquid is such as obtained by the process defined hereinabove or is constituted by the one previously set forth, in particular being substantially completely degassed or bereft of oxygen by addition to said coupling liquid of an efficient quantity of at least one gas- or oxygen-absorbing chemical substance.

According to a preferred embodiment, the pressure wave generator comprises a truncated ellipsoid filled with said coupling liquid, provided with at least two high voltage electric discharge electrodes at the inner focus of the truncated ellipsoid.

Thanks to the invention, the technical problem set forth hereinabove is solved.

In particular, the invention makes it possible to do without conventional degassing by placing the coupling liquid in vacuo, and by using a device for recirculating the coupling liquid, which represents a considerable reduction in dimensions and costs.

The invention makes it possible to obtain higher compression levels of the pressure waves than with a conventional physical degassing.

The invention prevents the coupling liquid from regassing in the course of time, which occurs when very low rates of dissolved gas, particularly oxygen, are attained, which is obtained thanks to the invention, this constituting a particularly unexpected result.

BRIEF DESCRIPTION OF THE DRAWING

The invention will be more readily understood on reading the following description with reference to the accompanying drawing, in which:

The single FIGURE represents the pressure values obtained on a pressure wave generator comprising a truncated ellipsoid, by electric discharge between two electrodes emitting an intermittent electric discharge at the inner focus of said generator, as a function of the concentration of gas-absorbing chemical substance, expressed in moles per liter.

DETAILED DESCRIPTION OF THE DRAWING

Referring now to the accompanying FIGURE, the pressure values are given in adimensional manner with respect to the pressure level serving as reference, obtained by conventional physical degassing as described in U.S. Pat. No. 4,530,358, and symbolized by the horizontal line, therefore of value 1.0.

Furthermore, this FIGURE shows two pressure curves obtained by chemical degassing according to the invention, either with non degassed tap water (curve * ... * ... *) or with tap water previously degassed by a conventional physical means, noted pre-degassed water (curve + --- + --- +), as a function of the concentration of chemical degassing substance according to the invention, for example sodium bisulfite, expressed in moles per liter.

It will be observed that, in order to obtain maximum pressure, the concentration of sodium bisulfite depends on the type of water and that, if the water is previously degassed, the necessary concentration of chemical substance is less.

In order to obtain pressure values greater than those obtained by physical degassing for tap water, a minimum concentration of $14.10^{-4}$ mol/l is necessary, whilst this effect is obtained for pre-degassed water as soon as sodium bisulfite is added.

The curves shown in the accompanying FIGURE therefore show that the invention enables pressure values to be obtained which are higher than the pressure obtained with conventional physical degassing, which demonstrates the efficiency of this mode of degassing. In addition, the fact of having a previous physical degassing does not lead to pressure levels higher than those obtained with water not degassed physically, which implies that the present invention can envisage doing without any physical degassing means without loss of performance, which constitutes a particularly unexpected advantage of the invention.

The chemical substance readily taking in gas, in particular oxygen according to the invention, must, of course, be soluble in the coupling liquid used. Consequently, if the coupling liquid is an aqueous solution, this chemical substance is water-soluble and if the coupling liquid is an oil, this chemical substance is oil-soluble.

What is claimed is:

1. A device for delivering pressure waves to a target, said device comprising:
means for generating a pressure wave;
means for transmitting said pressure wave to the target, said transmitting means comprising:
a container;
a coupling liquid contained by said container, said coupling liquid comprising a liquid having been treated with a predetermined amount of a chemical substance soluble in said coupling liquid, said predetermined amount of said chemical substance being sufficient to substantially completely degas oxygen from said coupling liquid so that said pressure wave is transmitted through said coupling liquid to said target substantially unimpeded by gas bubbles.

2. The pressure wave generator of claim 1, wherein said chemical substance is present in an amount sufficient to further substantially completely degas any gas introduced into said coupling liquid when said pressure waves are generated.

3. The pressure wave generator of claim 1, wherein said chemical substance comprises a sulfite.

4. The pressure wave generator of claim 3, wherein said sulfite is selected from the group consisting of an alkali metal sulfite and an alkaline earth metal sulfite.

5. The pressure wave generator of claim 3, wherein said chemical substance is selected from the group consisting of sodium bisulfite and potassium bisulfite.

6. The pressure wave generator of claim 1, wherein said coupling liquid comprises an aqueous solution.

7. The pressure wave generator of claim 1, wherein said coupling liquid comprises an oil.

8. The pressure wave generator of claim 1, wherein said predetermined amount of said chemical substance ranges approximately between $5.10^{-4}$ and $100.10^{-4}$ mol per liter.

9. The pressure wave generator of claim 1, wherein said pressure wave generating means and said transmitting means comprise a truncated ellipsoid filled with said coupling liquid and at least two high voltage electric discharge electrodes at the inner focus of the truncated ellipsoid.

10. A device for delivering pressure waves to a target, said device comprising:
means for generating a pressure wave;
means for transmitting said pressure wave to the target;
said transmitting means comprising;
a container;
a coupling liquid contained by said container, said coupling liquid having been treated with a predetermined amount of a chemical substance soluble in said coupling liquid, said predetermined amount of said chemical substance ranging approximately between $5.10^{-4}$ and $100.10^{-4}$ mol per liter and sufficient to substantially completely degas oxygen from said coupling liquid so that said pressure wave is transmitted through said coupling liquid to said target substantially unimpeded by gas bubbles.

11. The pressure wave generator of claim 10, wherein said chemical substance comprises a sulfite.

12. The pressure wave generator of claim 10, wherein said chemical substance comprises a sulfite selected from the group consisting of sodium bisulfite and potassium bisulfite.

13. The pressure wave generator of claim 10, wherein said coupling liquid comprises an aqueous solution.

14. The pressure wave generator of claim 10, wherein said coupling liquid comprises an oil.

15. A device for delivering shock waves to a target, said device comprising:
a truncated ellipsoid container having an inner and outer focus;
at least two high voltage electric discharge electrodes positioned at said inner focus for generating pressure waves;
a coupling liquid contained by said truncated ellipsoid container, said coupling liquid having been treated with a predetermined amount of a chemical substance soluble in said coupling liquid, said predetermined amount of chemical substance being sufficient to substantially completely degas oxygen from said coupling liquid so that said pressure wave is transmitted through said coupling liquid to said target positioned substantially at said outer focus substantially unimpeded by gas bubbles.

16. The pressure wave generator of claim 15, wherein said predetermined amount of said chemical substance ranges approximately between $5.10^{-4}$ to $100.10^{-4}$ mol per liter.

17. A method of treating a target with a pressure wave, comprising the steps of:
 providing a pressure wave generator comprising a container and means for generating pressure waves;
 providing a coupling liquid in said container; and
 substantially completely degassing oxygen from said coupling liquid by adding an amount of a soluble chemical substance to said coupling liquid; and
 generating a pressure wave and delivering said pressure wave substantially unimpeded by gas bubbles to said target.

18. The method of claim 17, wherein said chemical substance comprises a sulfite.

19. The method of claim 17, wherein said chemical substance is selected from the group consisting of sodium bisulfite and potassium bisulfite.

20. The method of claim 17, wherein said predetermined amount of said chemical substance ranges approximately between $5.10^{-4}$ and $100.10^{-4}$ mol per liter.

21. The method of claim 17, wherein said pressure wave generator further comprises a truncated ellipsoid having an inner focus, and further comprising the step of positioning at least two high voltage electric discharge electrodes at the inner focus of the truncated ellipsoid.

* * * * *